US009445166B2

(12) United States Patent
Hand et al.

(10) Patent No.: US 9,445,166 B2
(45) Date of Patent: Sep. 13, 2016

(54) ASSIGNMENT OF WAVELENGTHS TO OPTICAL SIGNALS IN AN OPTICAL NETWORK

(71) Applicant: Infinera Corporation, Sunnyvale, CA (US)

(72) Inventors: Steven Joseph Hand, Los Gatos, CA (US); Onur Turkcu, Santa Clara, CA (US); Sudhindra Aithal Kota, Bangalore (IN); Nitin K. Goel, Bangalore (IN); Marco E. Sosa, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 73 days.

(21) Appl. No.: 14/585,823

(22) Filed: Dec. 30, 2014

(65) Prior Publication Data
US 2016/0057519 A1    Feb. 25, 2016

Related U.S. Application Data

(60) Provisional application No. 62/041,325, filed on Aug. 25, 2014.

(51) Int. Cl.
*H04B 10/00* (2013.01)
*H04Q 11/00* (2006.01)
*H04J 14/02* (2006.01)
*H04L 12/751* (2013.01)

(52) U.S. Cl.
CPC ....... *H04Q 11/0066* (2013.01); *H04J 14/0212* (2013.01); *H04J 14/0241* (2013.01); *H04L 45/02* (2013.01); *H04Q 2011/009* (2013.01); *H04Q 2011/0086* (2013.01)

(58) Field of Classification Search
USPC ...................................................... 398/45–58
See application file for complete search history.

(56) References Cited

U.S. PATENT DOCUMENTS

| | | | | |
|---|---|---|---|---|
| 5,999,288 A * | 12/1999 | Ellinas | ................ | H04J 14/0227 398/59 |
| 8,238,748 B2 * | 8/2012 | Kuri | ................... | H04Q 11/0062 398/57 |
| 8,634,714 B2 * | 1/2014 | Yim | ..................... | H04J 14/0267 398/57 |
| 8,891,967 B2 * | 11/2014 | Parsons | .............. | H04Q 11/0062 398/51 |
| 8,897,640 B2 * | 11/2014 | Hui | ..................... | H04Q 11/0005 398/51 |
| 9,031,406 B2 * | 5/2015 | Hui | ........................ | H04J 14/022 398/50 |
| 9,294,942 B2 * | 3/2016 | Salonidis | .............. | H04W 28/18 |
| 2010/0158529 A1 * | 6/2010 | Kuri | ................... | H04Q 11/0062 398/79 |
| 2016/0057519 A1 * | 2/2016 | Hand | ................. | H04Q 11/0066 398/49 |

* cited by examiner

*Primary Examiner* — Agustin Bello
(74) *Attorney, Agent, or Firm* — Harrity & Harrity LLP; David L. Soltz

(57) ABSTRACT

A method may include determining, by a device, a wavelength identifier graph corresponding to an optical network based on a set of lightpath conflicts, for a set of optical signals, associated with a set of links and a set of nodes of the optical network. One or more optical signals may be associated with transmission via a super-channel. The method may further include selectively assigning, by the device, a wavelength identifier to an optical signal, of the set of optical signals, based on the wavelength identifier graph. The wavelength identifier being associated with a set of wavelength identifiers and corresponding to a wavelength of a set of wavelengths. The method may further include causing, by the device, the optical signal to utilize the wavelength, of the set of wavelengths, for transmission via the optical network.

20 Claims, 11 Drawing Sheets

Coloring Graph

Fiber Topology

Logical Topology of Optical Signals

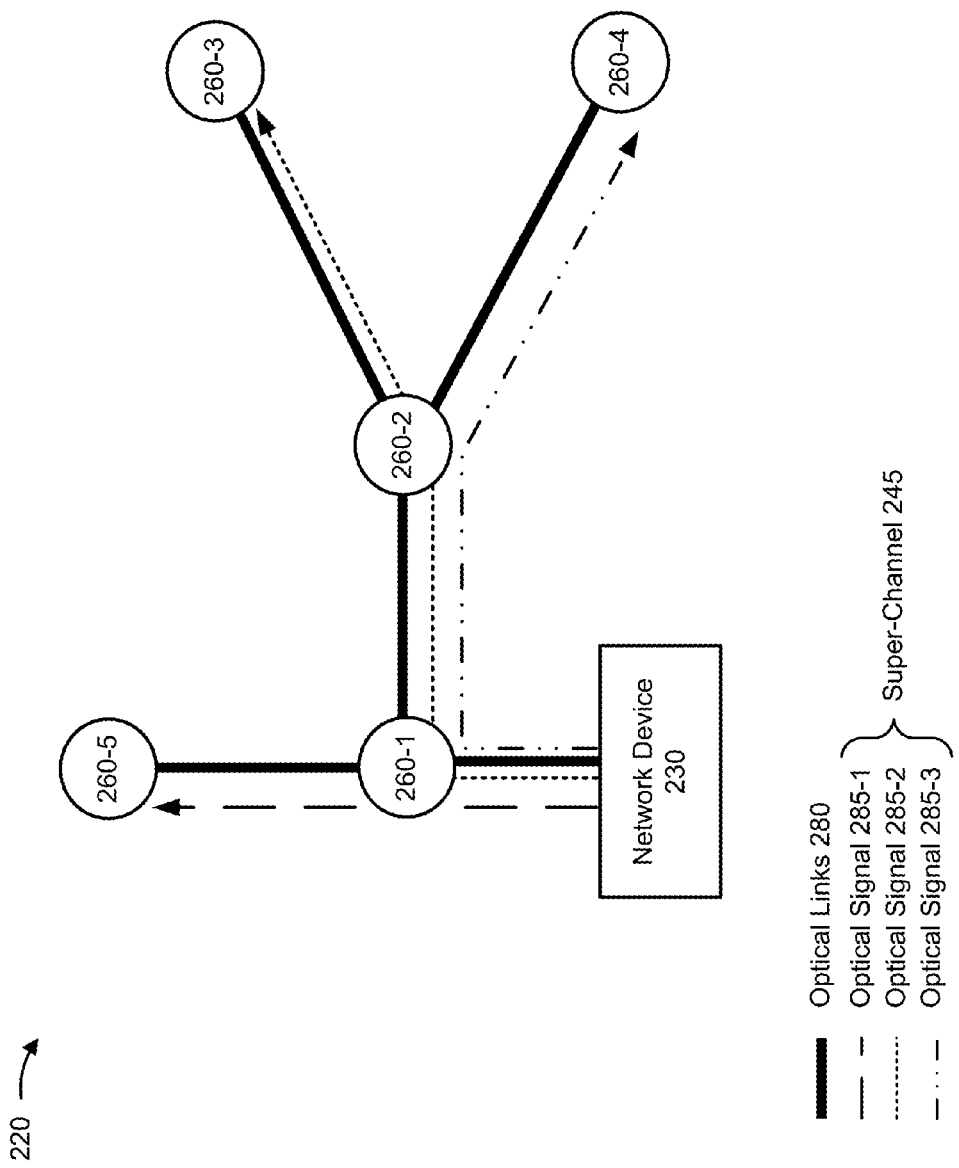

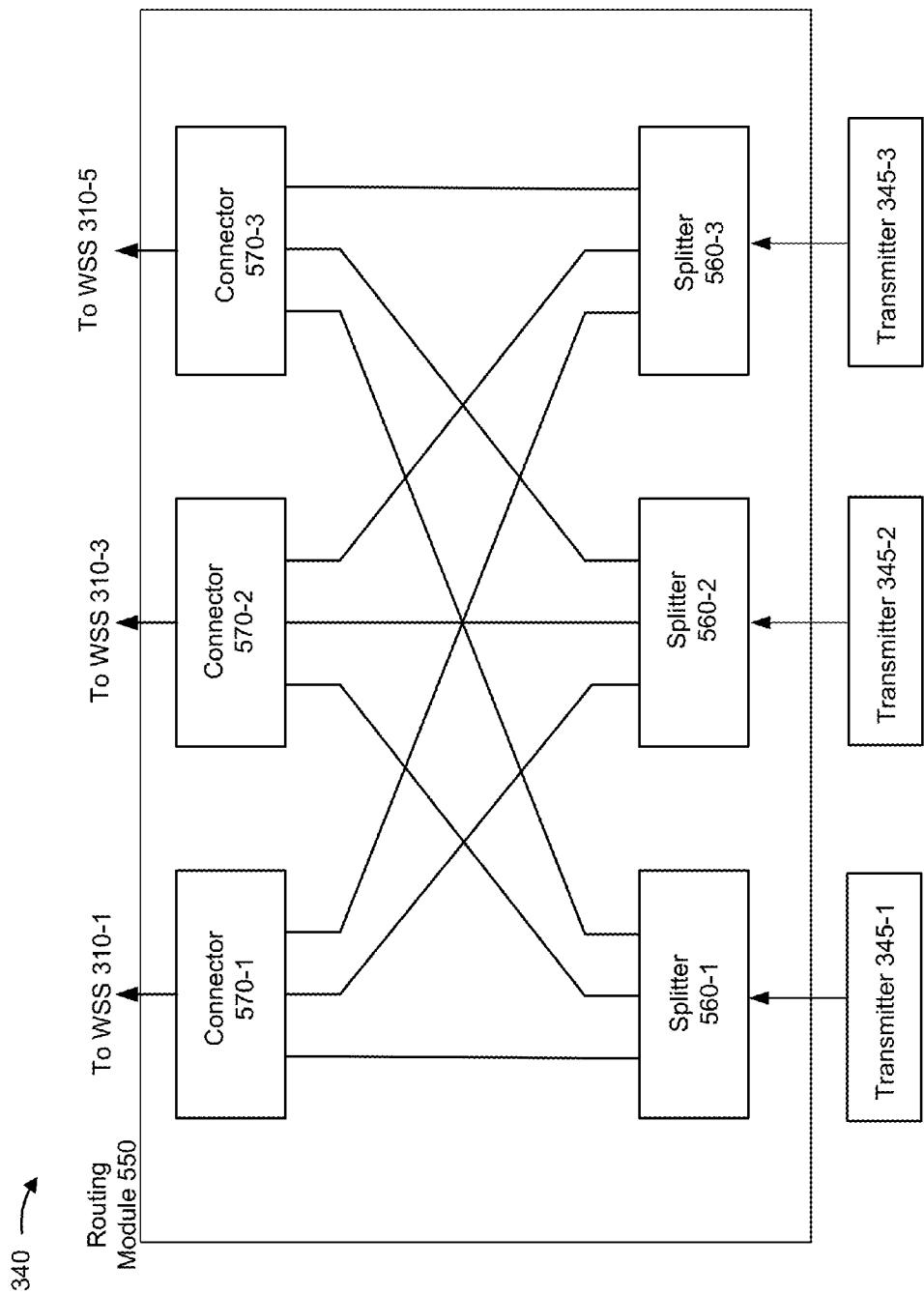

ASSIGNMENT OF WAVELENGTHS TO OPTICAL SIGNALS IN AN OPTICAL NETWORK

RELATED APPLICATION

This application claims priority under 35 U.S.C. §119 to U.S. Provisional Patent Application No. 62/041,325, filed on Aug. 25, 2014, the content of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal), which may be collectively integrated onto a common semiconductor substrate.

A WDM system may also include a receiver circuit, such as a receiver (Rx) PIC, having a photodiode, and an optical demultiplexer circuit (referred to as a "demultiplexer") configured to receive the combined output and demultiplex the combined output into individual optical signals.

A WDM system may also include a set of nodes (e.g., devices of the WDM system that may be utilized to route the multiple optical signals, add another optical signal to the multiple optical signals, drop an optical signal from the multiple optical signals, or the like. For example, the WDM system may include a set of reconfigurable optical add-drop multiplexers (ROADMs).

A wavelength of an optical signal output from the Tx PIC may be utilized to transmit information at a fixed data rate. However, multiple optical signals may be combined into a unified channel that facilitates transmission of information at a higher data rate (e.g., a super-channel). The multiple optical signals may or may not be contiguous with respect to the wavelength spectrum. One or more sets of optical signals may be associated into one or more super-channels for independent routing through a network.

SUMMARY

According to some possible implementations, an apparatus may determine a set of optical signals associated with an optical network including a set of optical links and a set of optical nodes. The apparatus may determine topology information for the set of optical signals and the optical network. The topology information may include information identifying a particular set of lightpath conflicts. The particular set of lightpath conflicts may include a first set of lightpath conflicts associated with the set of optical links and a second set of lightpath conflicts associated with the set of optical nodes. The topology information may correspond to a wavelength identifier graph. The wavelength identifier graph may include a set of vertices corresponding to the set of optical signals and a set of edges corresponding to the first set of lightpath conflicts and the second set of lightpath conflicts. The apparatus may select an optical signal, from the set of optical signals, based on the wavelength identifier graph. The apparatus may selectively assign a wavelength identifier, of a set of wavelength identifiers, to the optical signal based on the wavelength identifier graph. The wavelength identifier, of the set of wavelength identifiers, may correspond to a wavelength of a set of wavelengths. The apparatus may cause the optical signal to utilize the wavelength, of the set of wavelengths, for transmission via one or more super-channels of the optical network.

According to some possible implementations, one or more devices may determine topology information for a set of optical signals associated with an optical network that includes a set of optical nodes and a set of optical links. The topology information may identify a set of lightpath conflicts associated with the set of optical links and/or the set of optical nodes. The topology information may correspond to a graph that includes a set of vertices corresponding to the set of optical signals and a set of edges corresponding to the set of lightpath conflicts. The one or more devices may selectively assign a set of wavelengths to the set of optical signals based on the graph. The one or more devices may cause a plurality of optical nodes, of the set of optical nodes, to transmit or receive the set of optical signals using the assigned set of wavelengths.

According to some possible implementations, a method may include determining, by a device, a wavelength identifier graph corresponding to an optical network based on a set of lightpath conflicts, for a set of optical signals, associated with a set of links and a set of nodes of the optical network. One or more optical signals may be associated with transmission via a super-channel. The method may further include selectively assigning, by the device, a wavelength identifier to an optical signal, of the set of optical signals, based on the wavelength identifier graph. The wavelength identifier being associated with a set of wavelength identifiers and corresponding to a wavelength of a set of wavelengths. The method may further include causing, by the device, the optical signal to utilize the wavelength, of the set of wavelengths, for transmission via the optical network.

BRIEF DESCRIPTION OF THE DRAWINGS

FIGS. 2A-2C are diagrams of an example environment in which systems and/or methods, described herein, may be implemented;

FIGS. 5A and 5B are diagrams of example components of a transmit portion shown in FIG. 3;

DETAILED DESCRIPTION

The following detailed description of example implementations refers to the accompanying drawings. The same reference numbers in different drawings may identify the same or similar elements.

An optical transmitter associated with a wavelength division multiplexed (WDM) optical communication system may transmit multiple optical signals via a single optical communication path using an optical multiplexer circuit. The optical transmitter may provide the multiple optical signals along one or more wavelengths via one or more super-channels. The optical transmitter may transmit the one or more super-channels that include the multiple optical signals to a receive node, which may include an optical receiver, of a network. When an optical signal is added/dropped at a node of the network, wavelengths, at which a set of optical signals are to be transmitted/received, may be re-assigned among the set of optical signals.

The optical signals that are transmitted via an optical communication path (e.g., an optical fiber, a link, or the like) may be assigned different wavelengths to avoid a fiber lightpath conflict, a photonic integrated circuit (PIC) lightpath conflict, or the like. A conflict (e.g., multiple optical signals utilizing the same wavelength via the same optical communication path) may cause signal degradation, erroneous data reception, or the like. A fiber lightpath conflict may occur when an optical signal within a super-channel is added to an optical communication path that already includes another optical signal with the same wavelength. A PIC lightpath conflict may occur when an optical signal, which is being transmitted from/to a particular PIC, conflicts with another optical signal, which is being transmitted from/to the particular PIC. An optical signal may include a tunability constraint, a routability constraint, or another similar constraint. A tunability constraint may refer to a set of wavelengths to which a transmitter/receiver PIC associated with transmitting/receiving the optical signal may tune. A routability constraint may refer to a restraint on a quantity of directions on which a set of optical signals transmitted by/received from a PIC may be routed.

Implementations, described herein, may facilitate adding/dropping an optical signal of a super-channel by a reconfigurable optical add-drop multiplexer (ROADM) without adding and/or dropping one or more other optical signals of the super-channel. Additionally, or alternatively, implementations, described herein, may facilitate a wavelength assignment for a set of optical signals being transmitted via a super-channel that avoids a fiber lightpath conflict, a PIC lightpath conflict, or the like, and that accords with a tunability constraint, a routability constraint, and/or another similar constraint.

Figure 1C:
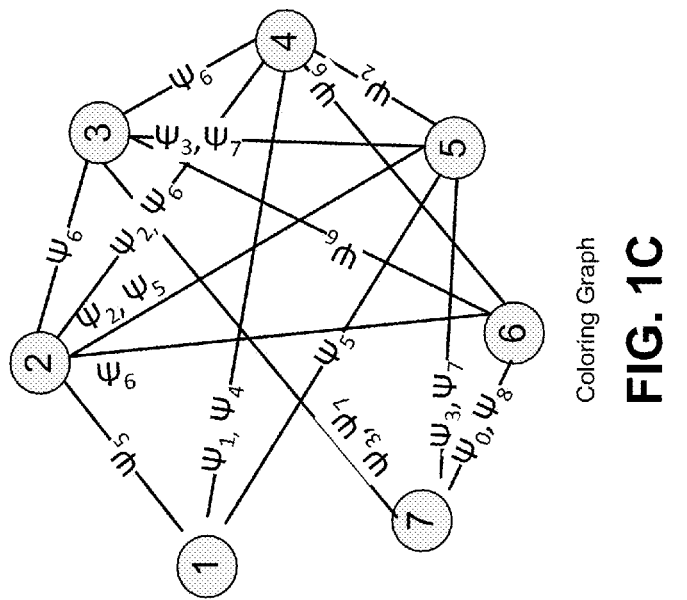
FIGS. 1A-1C are diagrams of an overview of an example implementation described herein.
Figure 1A:
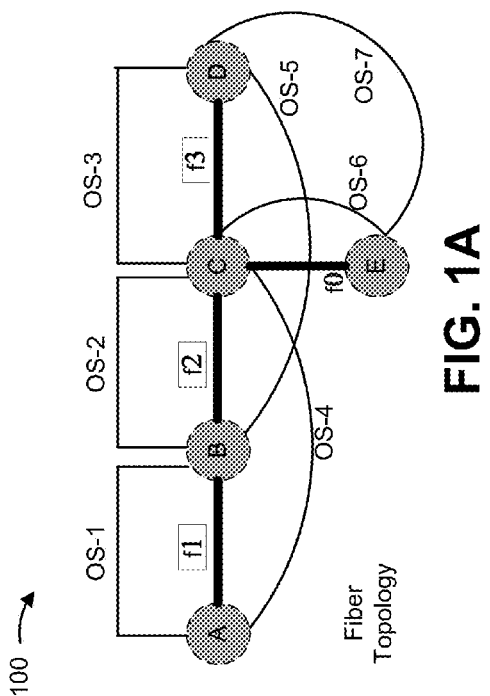
Figure 1B:
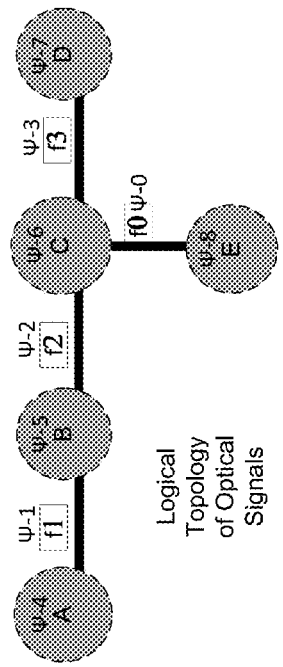

FIGS. 1A-1C are diagrams of an overview of an example implementation 100 described herein. As shown in FIG. 1A, a set of optical signals (e.g., OS-1, OS-2, OS-3, OS-4, OS-5, OS-6, and OS-7) may be transmitted over a network. A network management device may determine a fiber topology for the network. The fiber topology of the network may include a set of nodes (e.g., Node A, Node B, Node C, Node D, and Node E). The set of nodes may include a set of ROADMs that may permit add/drop of an optical signal, of a set of optical signals included in a super-channel, without adding/dropping other optical signals of the set of optical signals. The set of nodes may be connected by a set of fiber optical communication paths (e.g., f0, f1, f2, and f3). For example, a Tx PIC associated with a ROADM of Node A may transmit OS-1 via f1 to an Rx PIC associated with a ROADM of Node B. Similarly, a Tx PIC associated with the ROADM of Node B may transmit OS-5 via f2 and f3 to an Rx PIC associated with a ROADM of Node D.

With respect to FIG. 1B, the network management device may determine a logical topology for the network that identifies a set of fiber lightpath conflicts, a set of PIC lightpath conflicts, or the like associated with the network. For example, the network management device may determine that the Tx PIC associated with the ROADM of Node A may transmit OS-1 and OS-4 via fiber path 1, potentially causing fiber lightpath conflict Ψ-1. Similarly, the network management device may determine that other fiber paths may be associated with a potential fiber lightpath conflict (e.g., fiber path f0 with potential lightpath conflict Ψ-0, fiber path f2 with potential lightpath conflict Ψ-2, and fiber path f3 with potential lightpath conflict ω-3). Additionally, or alternatively, the network management device may determine that OS-1, OS-2, and OS-5 may be transmitted/received via a Tx PIC/Rx PIC associated with the ROADM of Node B, potentially causing PIC lightpath conflict Ψ-5. Similarly, the network management device may determine that other nodes may be associated with a potential PIC lightpath conflict (e.g., Node A with Ψ-4, Node C with Ψ-6, Node D with Ψ-7, and Node E with Ψ-8).

With respect to FIG. 1C, the network management device may generate a wavelength identifier graph representing the logical topology of the optical signals. An optical signal, of the set of optical signals, may be represented by a vertex of the wavelength identifier graph. A lightpath conflict (e.g., a potential fiber lightpath conflict, a potential PIC lightpath conflict, or the like), of the set of lightpath conflicts, may be represented by an edge of the wavelength identifier graph. A particular edge, associated with a particular lightpath conflict, may connect to a pair of vertices associated with a pair of optical signals. An edge may be associated with multiple lightpath conflicts. For example, a first edge associated with Ψ-0 and a second edge associated with Ψ-8 would both connect to a pair of vertices associated with OS-6 and OS-7 because Ψ-0 is associated with f6 which carries OS-6 and OS-7 and Ψ-8 is associated with Node E which transmits OS-6 and OS-7. In this case, the first edge and the second edge may be consolidated into a single edge (e.g., represented as "Ψ-0, Ψ-8").

With respect to FIG. 1C, the network management device may select a particular vertex for wavelength assignment and may select a wavelength identifier, such that the particular vertex is not assigned the same wavelength identifier as another vertex with which the particular vertex shares an edge. In other words, an optical signal, of a super-channel, associated with a vertex may be assigned a wavelength for transmission via the super-channel, so that a lightpath conflict does not result in interference with another optical signal of the super-channel. The network management device may determine whether the wavelength associated with the wavelength identifier is tunable by a Tx PIC of a first ROADM associated with transmitting the particular optical signal and an Rx PIC of a second ROADM associated with receiving the particular optical signal. The network management device may determine whether the wavelength is routable based on a limited degrees of routability for the Tx PIC and the Rx PIC. If the wavelength of the particular optical signal conflicts with the wavelength of another optical signal, is not tunable, and/or is not routable, the network management device may select another available wavelength identifier associated with another wavelength. If no other wavelength identifier is available, the network management device may assign the optical signal to another PIC (e.g., another Tx PIC of the first ROADM, another Rx PIC of the second ROADM, or the like) and may update the wavelength identifier graph (e.g., to remove the optical signal from the wavelength identifier graph, to remove lightpath conflicts associated therewith, or the like). If the wavelength does not conflict with the wavelength of another optical signal, is tunable, and is routable, the network management device may assign the wavelength to the particular optical signal and may perform wavelength assignment for one or more other optical signals (e.g., iteratively) until wavelength assignment is complete.

In this way, a network management device may efficiently perform wavelength assignment that accords with constraints on tunability and routability for a set of optical signals that may be added and/or dropped by a ROADM at a node of a network.

Figure 2A:
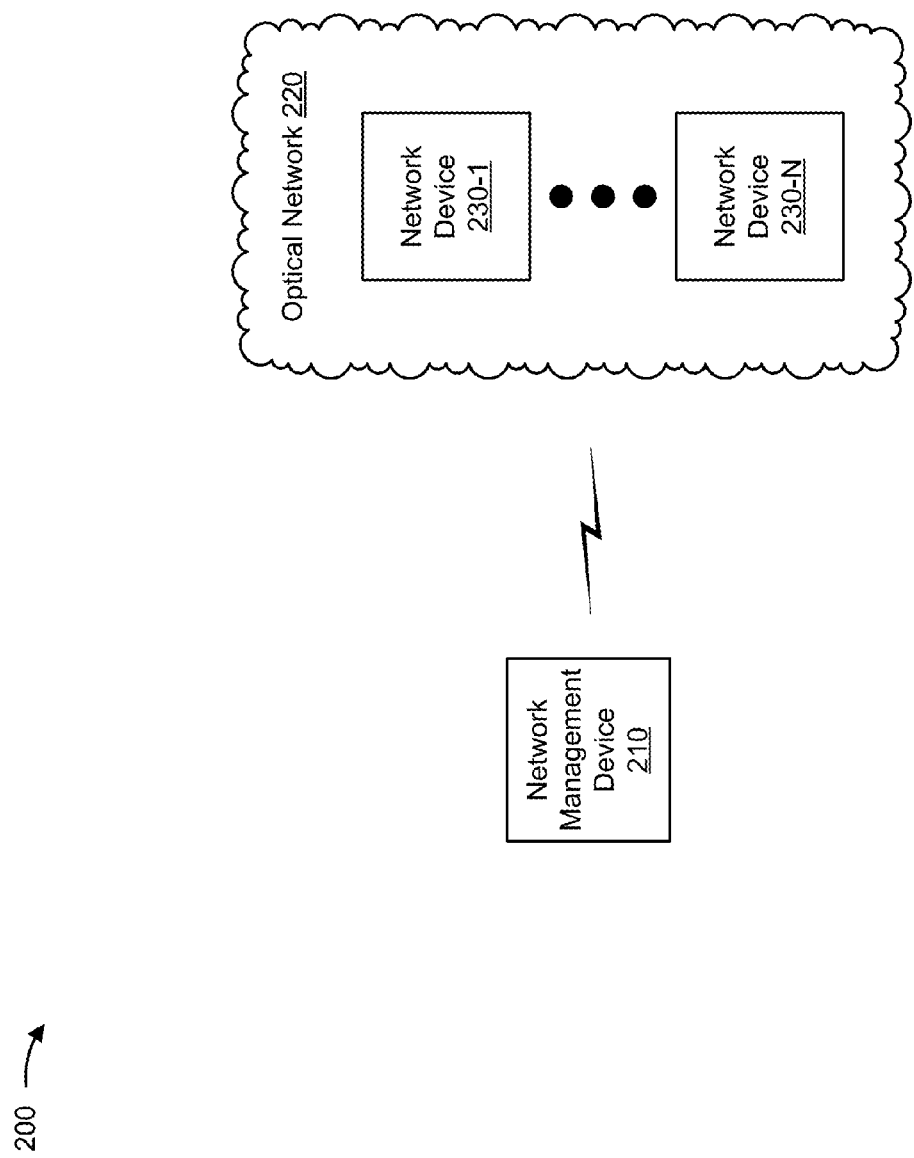
Figure 2B:
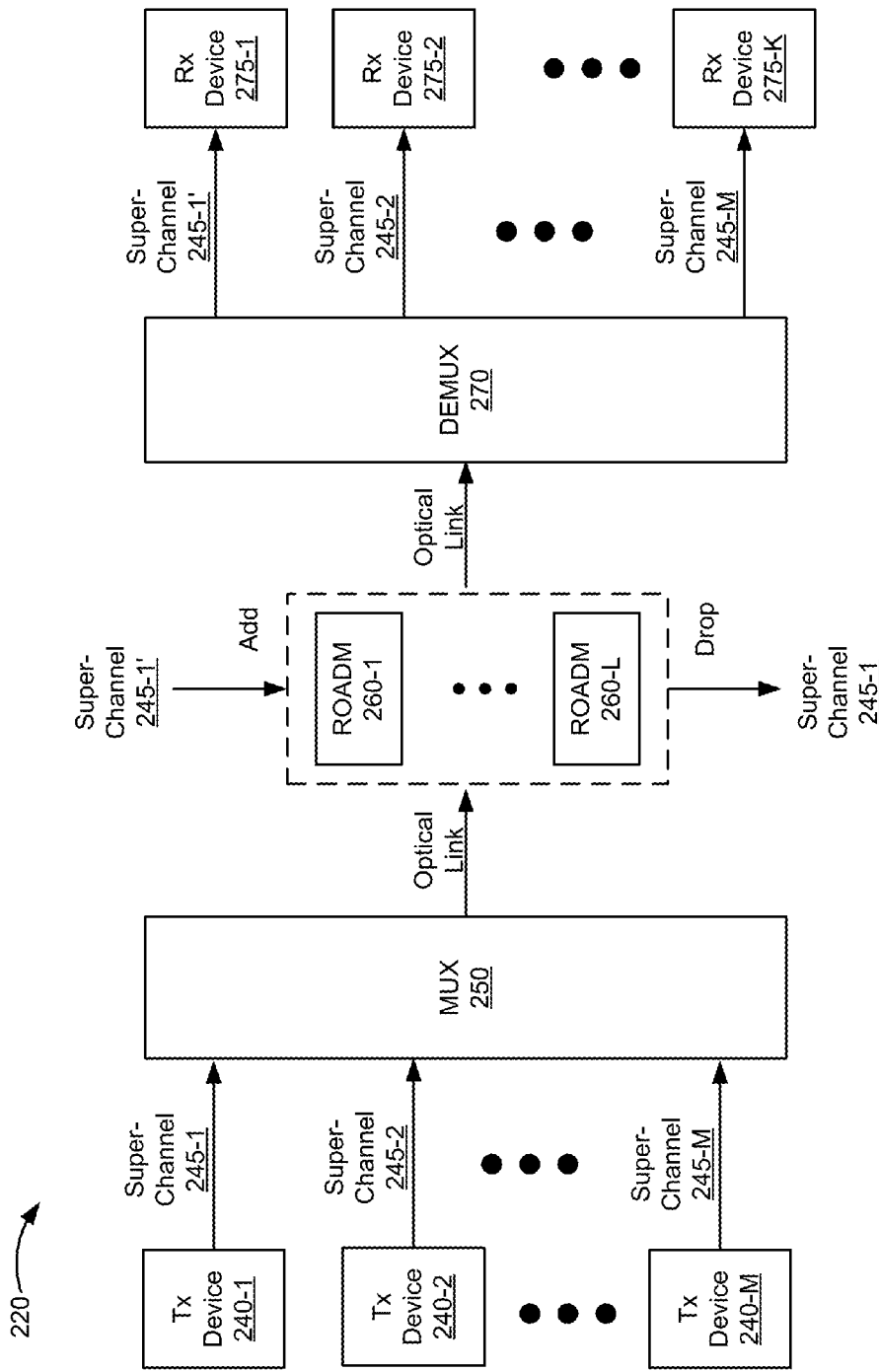

FIGS. 2A-2C are diagrams of an example environment 200 in which systems and/or methods, described herein, may be implemented. As shown in FIG. 2A, environment 200 may include a network management device 210, and an optical network 220, which may include a set of network devices 230-1 through 230-N(N≥1) (hereinafter referred to individually as "network device 230," and collectively as "network devices 230"). Devices of environment 200 may interconnect via wired connections, wireless connections, or a combination of wired and wireless connections.

Network management device 210 may include one or more devices capable of receiving, generating, storing, processing, and/or providing information associated with a network (e.g., optical network 220). For example, network management device 210 may include a computing device, such as a server or a similar type of device. Network management device 210 may assist a user in modeling and/or planning a network, such as optical network 220. For example, network management device 210 may assist in modeling and/or planning an optical network configuration, which may include quantities, locations, capacities, parameters, and/or configurations of network devices 230. In some implementations, network management device 210 may determine a wavelength assignment for a set of optical signals being provided via a set of network devices 230. In some implementations, network management device 210 may be associated with a user interface. In some implementations, network management device 210 may be a distributed device associated with one or more network devices 230. In some implementations, network management device 210 may be separate from network device 230, but may be linked to network device 230 via a protocol interface, such as an application programming interface, or the like.

Optical network 220 may include any type of network that uses light as a transmission medium. For example, optical network 220 may include a fiber-optic based network, an optical transport network, a light-emitting diode network, a laser diode network, an infrared network, and/or a combination of these or other types of optical networks. Optical network 220 may include one or more optical routes (e.g., optical lightpaths) that may specify a route along which light is carried (e.g., using one or more optical links) between two or more network devices 230 (e.g., via an optical link). An optical link may include an optical fiber, an optical control channel, an optical data channel, or the like, and may carry an optical channel (e.g., a signal associated with a particular wavelength of light), an optical super-channel (e.g., a set of optical signals), a super-channel set, an optical carrier set, a set of spectral slices, or the like.

Network device 230 may include one or more devices capable of receiving, generating, storing, processing, and/or providing data carried by an optical signal via an optical link. For example, network device 230 may include one or more optical data processing and/or optical traffic transfer devices, such as an optical amplifier (e.g., a doped fiber amplifier, an erbium doped fiber amplifier, a Raman amplifier, etc.), an optical add-drop multiplexer (OADM) (e.g., a reconfigurable optical add-drop multiplexer (ROADM), a flexibly reconfigurable optical add-drop multiplexer ("FROADM") that may utilize a flexible wavelength grid, etc.), an optical source device (e.g., a laser source), an optical destination device (e.g., a laser sink), an optical multiplexer, an optical demultiplexer, an optical transmitter, an optical receiver, an optical transceiver, a photonic integrated circuit (PIC), an integrated optical circuit, or the like. In some implementations, network device 230 may include one or more optical components. Network device 230 may process and/or transmit an optical signal (e.g., to another network device 230 via an optical link) to deliver the optical signal through optical network 220.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

FIG. 2B is a diagram of example devices of optical network 220 that may be designed, monitored, and/or configured according to implementations described herein. One or more devices shown in FIG. 2B may operate within optical network 220, and may correspond to one or more network devices 230 and/or one or more optical components of a network device 230. As shown, optical network 220 may include a set of optical transmitter devices 240-1 through 240-M (M≥1) (hereinafter referred to individually as "Tx device 240," and collectively as "Tx devices 240"), a set of super-channels 245-1 through 245-M (M≥1) (hereinafter referred to individually as "super-channel 245," and collectively as "super-channels 245"), a multiplexer ("MUX") 250, a set of ROADMs 260-1 through 260-L (L≥1) (hereinafter referred to individually as "ROADM 260," and collectively as "ROADMs 260"), a demultiplexer ("DEMUX") 270, and one or more optical receiver devices 275-1 through 275-K (K≥1) (hereinafter referred to individually as "Rx device 275," and collectively as "Rx devices 275").

Tx device 240 may include, for example, an optical transmitter and/or an optical transceiver that generates an optical signal. For example, Tx device 240 may include one or more integrated circuits, such as a transmitter photonic integrated circuit (PIC), an application specific integrated circuit (ASIC), or the like. In some implementations, Tx device 240 may include a laser associated with each wavelength, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). One or more optical signals may be carried as super-channel 245. In some implementations, a single Tx device 240 may be associated with a single super-channel 245. In some implementations, a single Tx device 240 may be associated with multiple super-channels 245, or multiple Tx devices 240 may be associated with a single super-channel 245. In some implementations, Tx device 240 may correspond to and/or include one or more components described herein with regards to FIG. 5A.

Super-channel 245 may include multiple channels (e.g., optical signals) multiplexed together using wavelength-division multiplexing to increase transmission capacity. Various quantities of channels may be combined into super-channels using various modulation formats to create different super-channel types having different characteristics. Additionally, or alternatively, an optical link may include a super-channel set. A super-channel set may include multiple super-channels multiplexed together using wavelength-division multiplexing to increase transmission capacity.

Multiplexer 250 may include, for example, an optical multiplexer (e.g., an arrayed waveguide grating (AWG)) that combines multiple input super-channels 245 for transmission via an output fiber). For example, multiplexer 250 may combine super-channels 245-1 through 245-M, and may provide the combined super-channels 245 to ROADM 260 via an optical link (e.g., a fiber).

ROADM 260 may include, for example, an OADM, a ROADM, a FROADM, or the like. ROADM 260 may multiplex, de-multiplex, add, drop, and/or route multiple super-channels 245 into and/or out of a fiber (e.g., a single mode fiber). As illustrated, a particular ROADM 260, of the set of ROADMs 260, may drop super-channel 245-1 from a fiber, and may allow super-channels 245-2 through 245-M to continue propagating toward Rx device 275 and/or another ROADM 260. Dropped super-channel 245-1 may be provided to a device (not shown) that may demodulate and/or otherwise process super-channel 245-1 to output the data stream carried by super-channel 245-1. As further shown, ROADM 260 may add super-channel 245-1' to the fiber. Super-channel 245-1' and super-channels 245-2 through 245-M may propagate to demultiplexer 270 and/or another ROADM 260. A network including multiple ROADMs 260 is described in more detail herein in connection with FIG. 2C. Example components of ROADM 260 are described in more detail herein in connection with FIG. 3, FIG. 4, and FIGS. 5A and 5B.

Demultiplexer 270 may include, for example, an optical de-multiplexer (e.g., an arrayed waveguide grating) that separates multiple super-channels 245 carried over an input fiber. For example, demultiplexer 270 may separate super-channels 245-1' and super-channels 245-2 through 245-M, and may provide each super-channel 245 to a corresponding Rx device 275.

Rx device 275 may include, for example, an optical receiver and/or an optical transceiver that receives an optical signal. For example, Rx device 275 may include one or more integrated circuits, such as a receiver PIC, an ASIC, or the like. In some implementations, Rx device 275 may include a demultiplexer to receive combined output and demultiplex the combined output into individual optical signals, a photodetector to convert an optical signal to a voltage signal, an analog-to-digital converter to convert voltage signals to digital signals, and/or a digital signal processor to process the digital signals. One or more optical signals may be received by Rx device 275 via super-channel 245. Rx device 275 may convert a super-channel 245 into one or more electrical signals, which may be processed to output information associated with each data stream carried by an optical channel included in super-channel 245. In some implementations, a single Rx device 275 may be associated with a single super-channel 245. In some implementations, a single Rx device 275 may be associated with multiple super-channels 245, or multiple Rx devices 275 may be associated with a single super-channel 245. In some implementations, Rx device 275 may correspond to and/or include one or more components described herein with regards to FIG. 4. In some implementations, Rx device 275 and Tx device 240 may be implemented on a common substrate, such as a Tx/Rx PIC.

One or more devices shown in FIG. 2B may correspond to a single network device 230. In some implementations, a combination of devices shown in FIG. 2B correspond to a single network device 230. For example, Tx devices 240-1 through 240-M and multiplexer 250 may correspond to a single network device 230. As another example, Rx devices 275-1 through 275-K and demultiplexer 270 may correspond to a single network device 230.

The number and arrangement of devices shown in FIG. 2B are provided as an example. In practice, there may be additional devices, fewer devices, different devices, or differently arranged devices, included in optical network 220, than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices shown in FIG. 2B may perform one or more functions described as being performed by another set of devices shown in FIG. 2B.

FIG. 2C is a diagram of an example configuration of a network of multiple ROADMs 260 that may be designed, monitored, and/or configured as described herein. One or more ROADMs 260 shown in FIG. 2C may operate within optical network 220 of FIG. 2B.

As shown in FIG. 2C, optical network 220 may include a set of ROADMs 260-1 through 260-5 (e.g., nodes of a network) that may facilitate communication via optical network 220. Network device 230 (e.g., Tx device 240, Rx device 275, or the like) may output/receive super-channel 245 to/from ROADM 260-1 via optical link 280 (e.g., an optical fiber). ROADM 260-1 may be connected via a first optical link 280 to ROADM 260-2 and via a second optical link 280 to ROADM 260-5. Furthermore, for example, ROADM 260-2 may be connected via a first optical link 280 to ROADM 260-3 and via a second optical link 280 to ROADM 260-4. Super-channel 245 may include a set of optical signals 285-1 through 285-3. In some implementations, ROADM 260 may perform first node routing by, as a first node that receives a super-channel from a source of the super-channel, routing individual optical signals 285 of a super-channel to different ROADMs 260. In other words, a particular ROADM 260 that receives the individual optical signals 285 from a source of the individual optical signals 285 (e.g., network device 230), performs routing for the individual optical signals 285 to a set of other ROADMs 260. For example, ROADM 260-1 may receive optical signal 285-1 from network device 230 (e.g., Tx device 240) and may route optical signal 285-1 to ROADM 260-5 and may receive optical signal 285-2 from network device 230 (e.g., Tx device 240) and may route optical signal 285-2 to ROADM 260-2.

The number and arrangement of devices and/or signals shown in FIG. 2C are provided as an example. In practice, there may be additional devices and/or signals, fewer devices and/or signals, different devices and/or signals, or differently arranged devices and/or signals, included in optical network 220, than those shown in FIG. 2C. Furthermore, two or more devices shown in FIG. 2C may be implemented within a single device, or a single device shown in FIG. 2C may be implemented as multiple, distributed devices. Additionally, or alternatively, a set of devices shown in FIG. 2C may perform one or more functions described as being performed by another set of devices shown in FIG. 2C.

Figure 3:
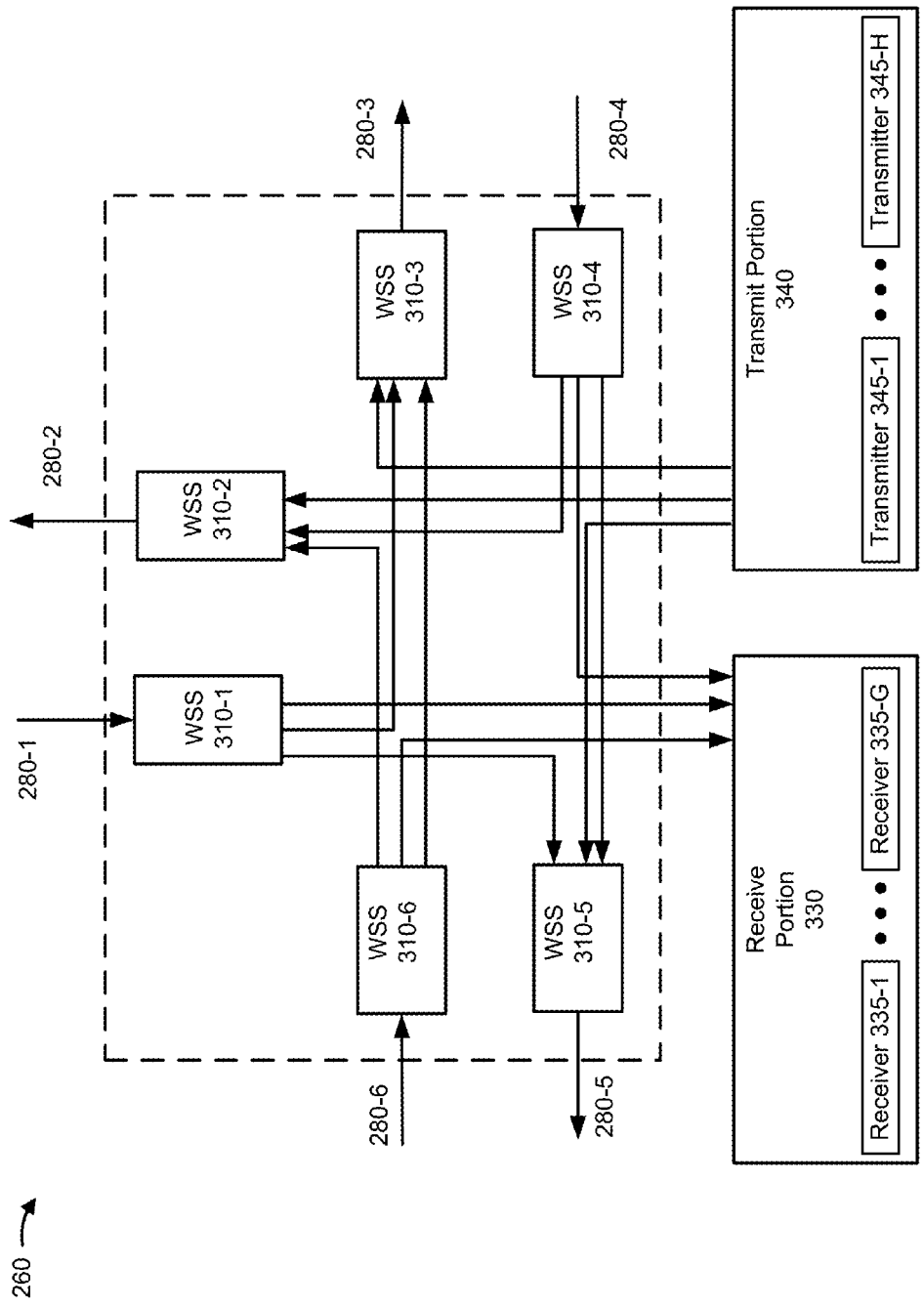
FIG. 3 is a diagram of example components of a reconfigurable optical add-drop multiplexer, shown in FIGS. 2A-2C, that may facilitate adding/dropping an optical signal of a super-channel and maintaining other optical signals of the super-channel.

FIG. 3 is a diagram of components of ROADM 260 shown in optical network 220 of FIG. 2B. As shown in FIG. 3, ROADM 260 may include a set of wavelength selective switches (WSSs) 310-1 through 310-6 (hereinafter referred to individually as "WSS 310," and collectively as "WSSs 310"), a set of optical links 280-1 through 280-6, a receive portion 330 which may include one or more receivers 335-1 through 335-G (G≥1) (hereinafter referred to individually as "receiver 335," and collectively as "receivers 335"), and a transmit portion 340, which may include one or more transmitters 345-1 through 345-H (H≥1) (hereinafter referred to individually as "transmitter 345," and collectively as "transmitters 345").

WSS 310 may include, for example, a switching array that may direct an optical signal. For example, a WSS 310 (e.g., WSS 310-1, WSS 310-4, and WSS 310-6 may receive a set of super-channels 245 via a corresponding optical link 280 (e.g., optical link 280-1, optical link 280-4, and optical link 280-6) and may selectively direct the set of super-channels to another WSS 310 (e.g., WSS 310-2, WSS 310-3, and WSS 310-5) for output to another ROADM 260 via another optical link 280 (e.g., optical link 280-2, optical link 280-3, and optical link 280-5). In some implementations, WSS 310 may receive super-channel 245 from transmit portion 340 for output to another ROADM 260. Additionally, or alternatively, WSS 310 may provide super-channel 245 to receive portion 330. In some implementations, WSS 310 may receive multiple super-channels 245 via optical link 280 and may provide a portion of the super-channels 245 to a first WSS 310 for output to a first ROADM 260 and another portion of the super-channels 245 to a second WSS 310 for output to a second ROADM 260. For example, WSS 310-1 may receive, via optical link 280-1, super-channel 245-1, super-channel 245-2, and super-channel 245-3, and WSS 310-1 may provide super-channel 245-1 to WSS 310-3 for output to ROADM 260-1, may provide super-channel 245-2 to WSS 310-5 for output to ROADM 260-1, and may provide super-channel 245-3 to receive portion 330.

Receive portion 330 may include one or more devices associated with receiving, processing, providing and/or routing super-channel 245 and/or optical signal 285. In some implementations, receive portion 330 may include one or more receivers 335-1 through 335-G as discussed herein with regard to FIG. 4. In some implementations, receive portion 330 may include a splitting device (not shown) associated with routing received optical signals to receivers 335. For example, receive portion 330 may include a power splitter, a demultiplexer, an arrayed waveguide grating, or the like, which may route an optical signal of a super-channel to receiver 335. In some implementations, receive portion 330 may receive a super-channel including polarization multiplexed optical signals and may separate a transverse electric (TE) polarization portion and a transverse mechanic (TM) polarization portion of a particular optical signal of the super-channel. In this case, a splitting device of receive portion 330 may provide the TE polarization portion to a first receiver 335 and may provide the TM polarization portion of the particular optical signal to a second receiver 335.

Transmit portion 340 may include one or more devices associated with receiving, processing, providing, and/or routing super-channel 245 and/or optical signal 285. In some implementations, transmit portion 340 may include one or more transmitters 345-1 through 345-H as discussed herein with regard to FIGS. 5A and 5B. In some implementations, transmitters 345 may provide a set of super-channels that may be routed to one or more WSSs 310 for transmission to another ROADM 260 or a network device 230. In some implementations, transmit portion 340 may utilize a single PIC that includes multiple transmitters 345. For example, transmit portion 340 may include a particular PIC that may transmit multiple optical signals via multiple wavelengths that may be independently adjusted by tuning a laser associated with the PIC, a local oscillator associated with the PIC, or the like.

While FIG. 3 shows ROADM 260 as including a particular quantity and arrangement of components, in some implementations, ROADM 260 may include additional components, fewer components, different components, or differently arranged components.

Figure 4:
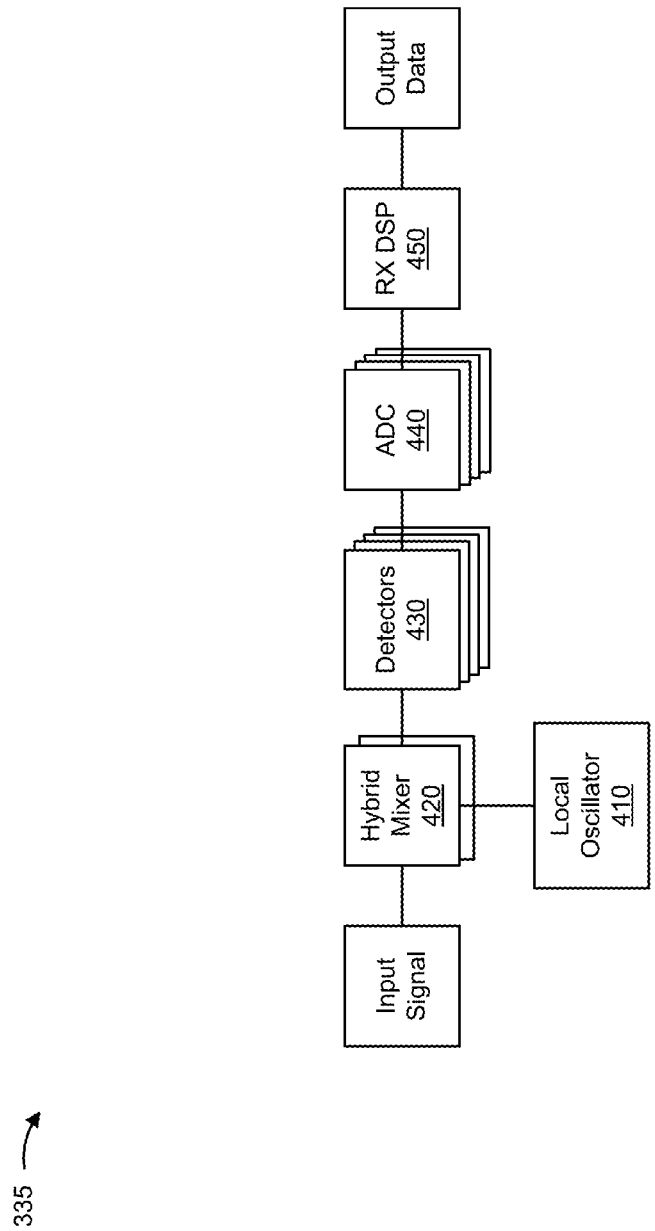
FIG. 4 is a diagram of example components of a receive portion shown in FIG. 3.

FIG. 4 is a diagram of example components of receiver 335 associated with receive portion 330 as shown in FIG. 3. As shown in FIG. 4, receiver 335 may include a local oscillator 410, one or more hybrid mixers 420, one or more detectors 430, one or more analog-to-digital converters (ADCs) 440, and/or an Rx DSP 450. In some implementations, local oscillator 410, hybrid mixer 420, detectors 430, ADCs 440, and/or Rx DSP 450 may be implemented on one or more integrated circuits, such as one or more PICs, one or more ASICs, etc.

Local oscillator 410 may include a laser device. In some implementations, local oscillator 410 may provide a reference signal to hybrid mixer 420. In some implementations, local oscillator 410 may include a single-sided laser to provide an optical signal to hybrid mixer 420. In some other implementations, local oscillator 410 may include a double-sided laser to provide multiple optical signals to multiple hybrid mixers 420. In some implementations, a phase, intensity, and/or amplitude of the reference signal may be compared to a phase, intensity, and/or amplitude of an input signal (e.g., another optical signal) to recover data carried by the input signal. In some implementations, the input signal may be received from a power splitter (not shown), that may provide a power-split portion of a super-channel as the input signal. In some implementations, the input signal may processed via a component of a demultiplexer (e.g., an arrayed waveguide grating (AWG), or the like) that may output a set of optical signals of a super-channel on a set of waveguides processing.

Hybrid mixer 420 may include one or more optical devices to receive an input signal (e.g., an optical signal of a super-channel). In some implementations, hybrid mixer 420 may receive a reference signal from local oscillator 410. In some implementations, hybrid mixer 420 may supply components associated with the input signal and the reference signal to detectors 430. For example, hybrid mixer 420 may supply an in-phase x-polarization (e.g., x-pol) component, a quadrature x-pol component, an in-phase y-polarization (e.g., y-pol) component, and a quadrature y-pol component. In some implementations, a first hybrid mixer 420 may provide the in-phase x-pol component and the quadrature x-pol component, and a second hybrid mixer 420 may provide the in-phase y-pol component and the quadrature y-pol component.

Detector 430 may include one or more photodetectors, such as a photodiode, to receive the output optical signal, from hybrid mixer 420, and convert the output optical signal to corresponding voltage signals. In some implementation, receiver 335 may include multiple detectors 430 for in-phase x-pol components, quadrature x-pol components, in-phase y-pol components, and quadrature y-pol components. In some implementations, detectors 430 may include one or more balanced pairs of photodetectors. For example, detectors 430 may include a first pair of photodetectors to receive an in-phase x-pol component, and a second pair of photodetectors to receive a quadrature x-pol component. Additionally, detectors 430 may include a third pair of photodetectors to receive an in-phase y-pol component, and a fourth pair of photodetectors to receive a quadrature y-pol component.

ADC 440 may include an analog-to-digital converter that converts the voltage signals from detector 430 to digital signals. ADC 440 may provide the digital signals to Rx DSP 450. In some implementations, optical receiver 253 may include four ADCs 440 or some other number of ADCs 440 (e.g., one ADC 440 for each electrical signal output by detectors 430).

Rx DSP 450 may include a digital signal processor or a collection of digital signal processors. In some implementations, Rx DSP 450 may receive digital signals from ADCs 440 and may process the digital signals to form output data associated with the input signal received by hybrid mixer 420. In some implementations, a set of processing circuits (e.g., that include clock and data recovery circuitry) may demodulate and output data associated with the digital signals.

While FIG. 4 shows receiver 335 as including a particular quantity and arrangement of components, in some implementations, receiver 335 may include additional components, fewer components, different components, or differently arranged components.

Figure 5A:
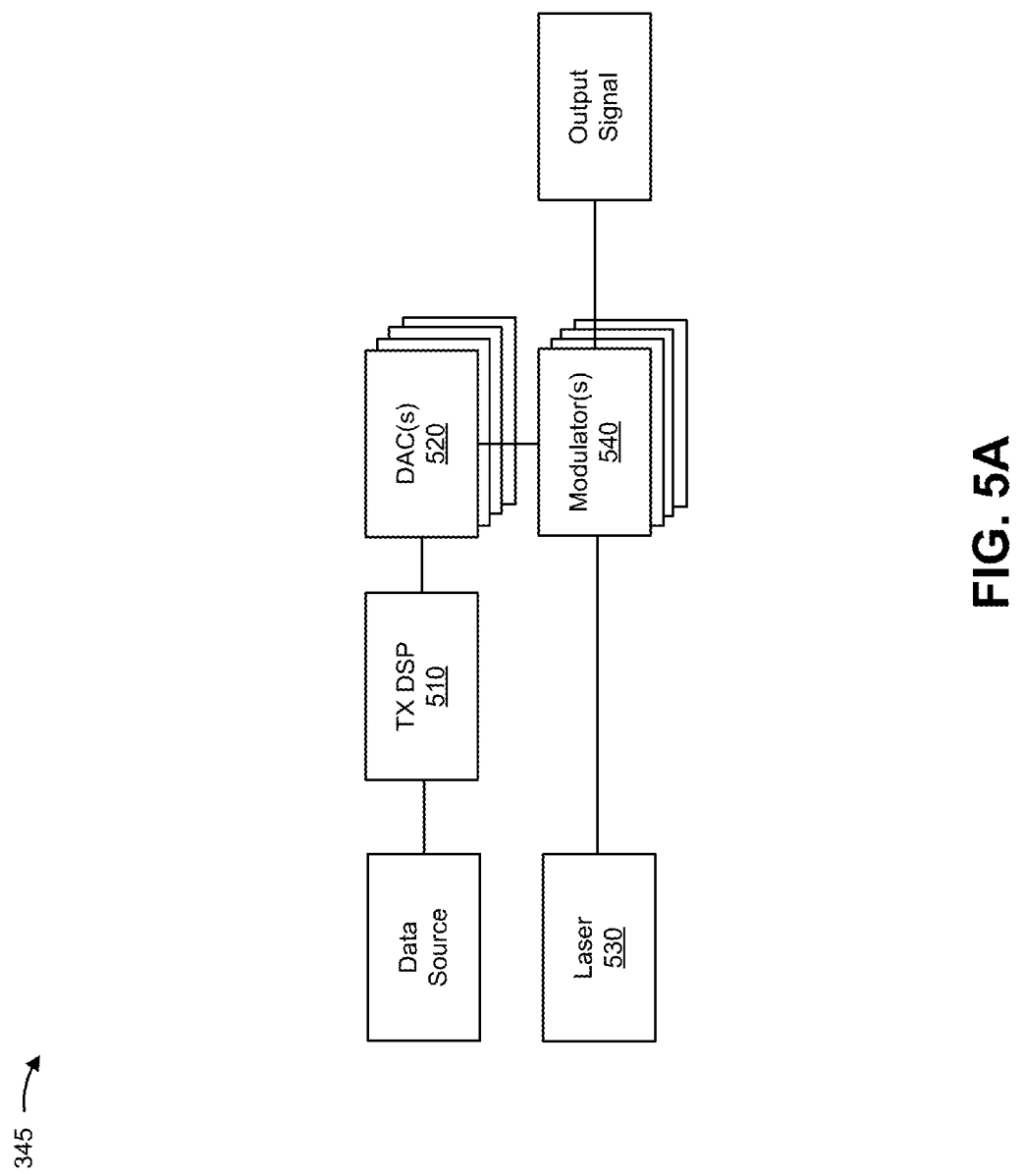

FIGS. 5A and 5B are diagrams of example components of transmit portion 340 shown in ROADM 220 of FIG. 3.

As shown in FIG. 5A, transmitter 345 of transmit portion 340 may include a Tx DSP 510, one or more DACs 520, a laser 530, and one or more modulators 540. In some implementations, Tx DSP 510, DACs 520, laser 530, and/or modulators 540 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 510 may include a digital signal processor or a collection of digital signal processors. In some implementations, Tx DSP 510 may receive a data source (e.g., a signal received via a Tx channel), may process the signal, and may output digital signals having symbols that represent components of the signal (e.g., an in-phase x-polarization component, a quadrature x-polarization component, an in-phase y-polarization component, and a quadrature y-polarization component).

DAC 520 may include a digital-to-analog converter or a collection of digital-to-analog converters. In some implementations, DAC 520 may receive respective digital signals from Tx DSP 510, may convert the received digital signals to analog signals, and may provide the analog signals to modulator 540. The analog signals may correspond to electrical signals (e.g., voltage signals) to drive modulator 540. In some implementations, transmitter 345 may include multiple DACs 520, where a particular DAC 520 may correspond to a particular polarization (e.g., an x-polarization, a y-polarization) of a signal and/or a particular component of a signal (e.g., an in-phase component, a quadrature component).

Laser 530 may include a semiconductor laser, such as a distributed feedback (DFB) laser, or some other type of laser. Laser 530 may provide an output optical light beam to modulator 540.

Modulator 540 may include a Mach-Zehnder modulator (MZM), such as a nested MZM, or another type of modulator. Modulator 540 may receive the optical light beam from laser 530 and the voltage signals from DAC 520, and may modulate the optical light beam, based on the voltage signals, to generate a multiple sub-carrier output signal, which may be provided to a multiplexer.

In some implementations, transmitter 345 may include multiple modulators 540, which may be used to modulate signals of different polarizations. For example, an optical splitter may receive an optical light beam from laser 530, and may split the optical light beam into two branches: one for a first polarization (e.g., an x-polarization) and one for a second polarization (e.g., the y-polarization). The splitter may output one optical light beam to a first modulator 540, which may be used to modulate signals of the first polarization, and another optical light beam to a second modulator 540, which may be used to modulate signals of the second polarization. In some implementations, two DACs 520 may be associated with each polarization. In these implementations, two DACs 520 may supply voltage signals to the first modulator 540 (e.g., for an in-phase component of the x-polarization and a quadrature component of the x-polarization), and two DACs 520 may supply voltage signals to the second modulator 540 (e.g., for an in-phase component of the y-polarization and a quadrature component of the y-polarization). The outputs of modulators 540 may be combined back together using combiners and polarization multiplexing. For example, a power-combiner, AWG, or the like (not shown) may combine a set of modulated optical signals and provide the output signal.

In some implementations, transmitter 345 may transmit a set of optical signals via a set of different wavelengths. For example, transmitter 345 may transmit a first optical signal via a first wavelength and a second optical signal via a second wavelength. Additionally, or alternatively, transmitter 345 may independently adjust a wavelength, such as by changing a temperature of laser 330, adjusting a quantity of current supplied to laser 330, or the like. For example, transmitter 345 may alter a first wavelength associated with a first optical signal without altering a second wavelength associated with a second optical signal.

The number and arrangement of components shown in FIG. 5A are provided as an example. In practice, transmitter 345 may include additional components, fewer components, different components, or differently arranged components than those shown in FIG. 5A. For example, the quantity of DACs 520, lasers 530, and/or modulators 540 may be selected to implement a transmitter 345 that is capable of generating polarization diverse signals for transmission on an optical fiber. Additionally, or alternatively, a set of components shown in FIG. 5A may perform one or more functions described herein as being performed by another set of components shown in FIG. 5A.

As shown in FIG. 5B, transmit portion 340 may include a set of transmitters 345-1 through 345-3 and a routing module 550, which may include a set of splitters 560-1 through 560-3 and a set of connectors 570-1 through 570-3. In another example, transmit portion 340 may include another quantity of transmitters 345, another quantity of splitters 560, another quantity of connectors 570, or the like. In some implementations, each transmitter 345 of transmit portion 340 may provide a corresponding super-channel and/or a corresponding set of optical signals to a particular splitter 560 of routing module 550.

In some implementations, splitter 560 may receive a super-channel from transmitter 345 and may provide a power split portion of the super-channel to a set of connectors 570. For example, splitter 560-1 may receive a particular super-channel from transmitter 345-1 and may provide a first portion of the particular super-channel to connector 570-1, a second portion of the particular super-channel to connector 570-2, and/or a third portion of the particular super-channel to connector 570-3. Similarly, splitter 560-2 and splitter 560-3 may receive other super-channels from transmitter 345-2 and transmitter 345-3, respectively, and may provide first portions of the other super-channels to connector 570-1, second portions of the other super-channels to connector 570-2, and/or third portions of the other super-channels to connector 570-3. In some implementations, connector 570 may provide a received portion of a super-channel to a particular WSS 310. For example, connector 570-1 may receive a first portion of a first super-channel from splitter 560-1, a second portion of a second super-channel from splitter 560-2, and a third portion of a third super-channel from splitter 560-3, and connector 570-1 may provide the first portion, the second portion, and the third portion to WSS 310-1.

The number and arrangement of devices shown in FIG. 5B are provided as an example. In practice, there may be additional devices, fewer devices, different devices, or differently arranged devices. For example, while transmit portion 340 is shown as including three transmitters with three splitters and three connectors, transmit portion 340 may include another quantity of transmitters with corresponding quantities of splitters and connectors. Additionally, or alternatively, transmit portion 340 may include another device or set of devices associated with routing optical signals, such as a switch, or the like.

Figure 6A:
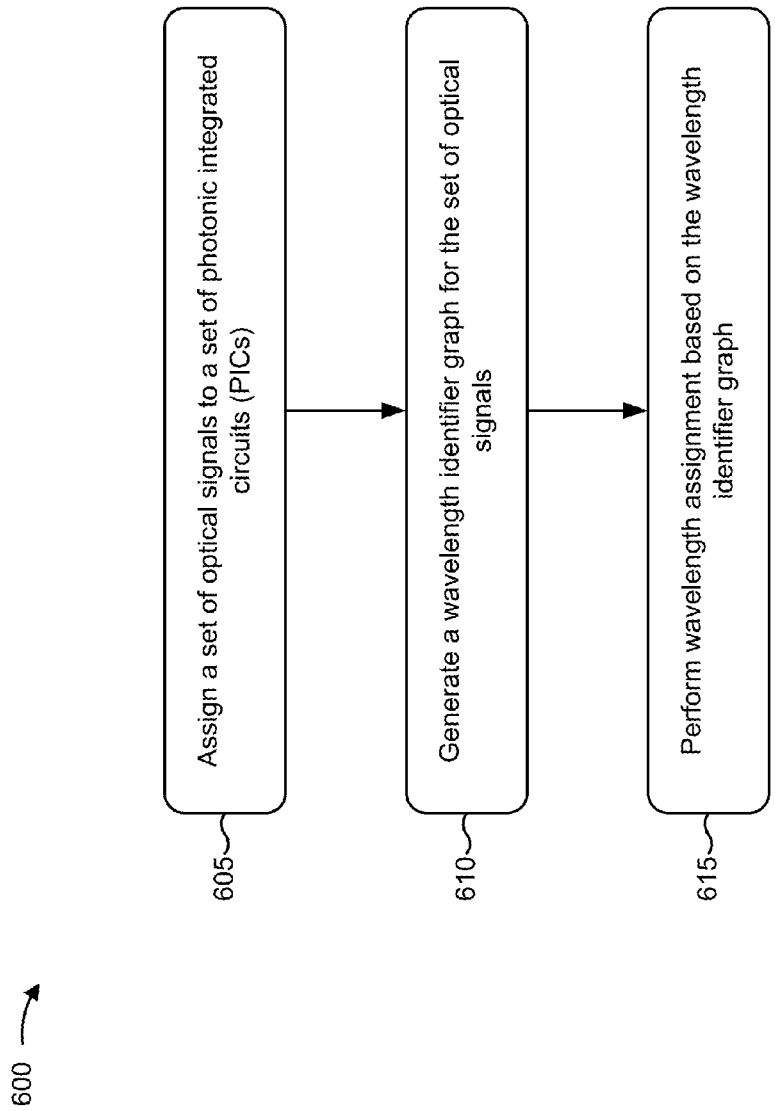
FIGS. 6A and 6B are flow charts of an example process for performing optical signal wavelength assignment that accords with constraints on tunability and routability.
Figure 6B:
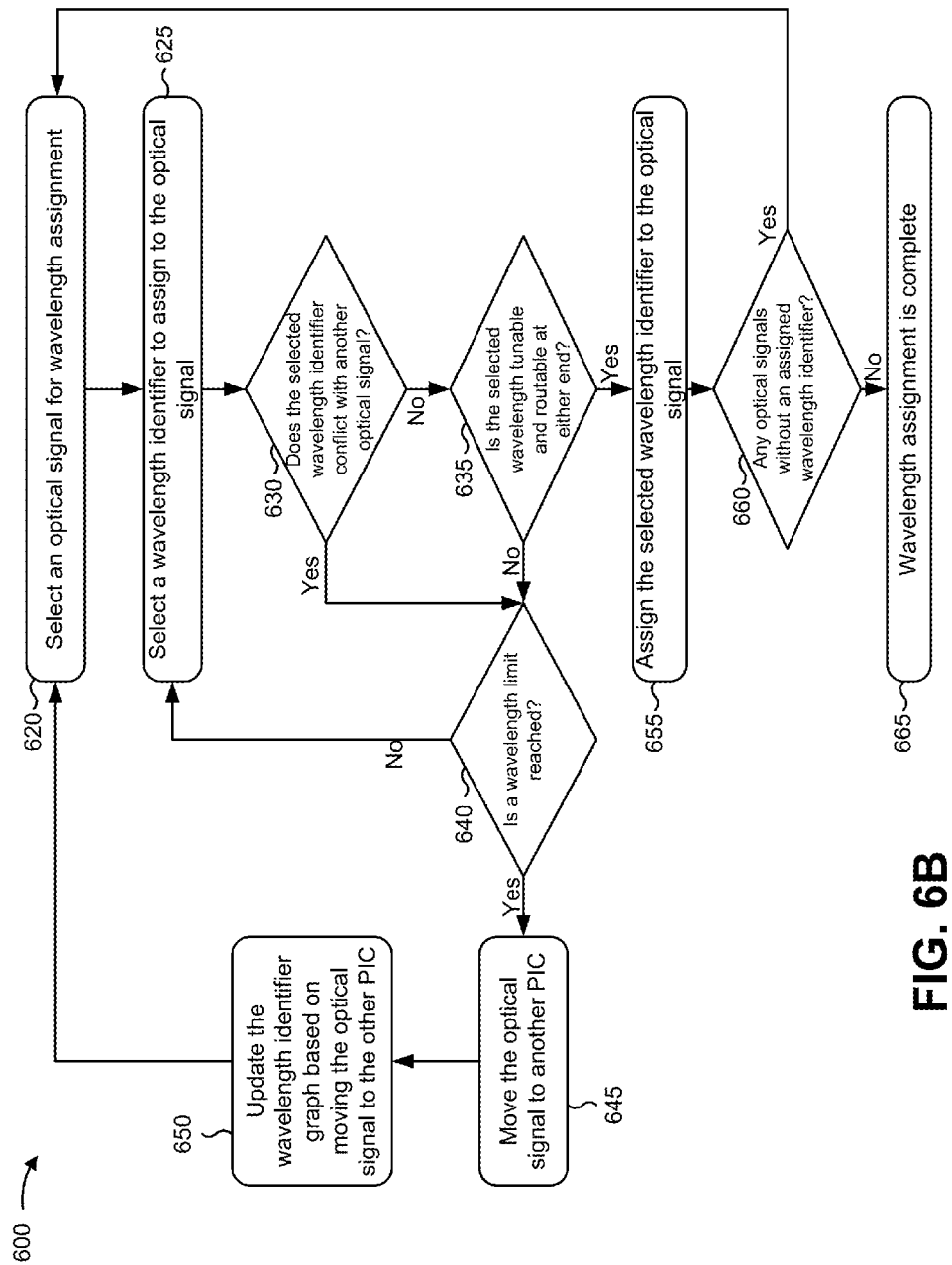

FIGS. 6A and 6B are flow charts of an example process 600 for performing optical signal wavelength assignment that accords with constraints on tunability and routability. In some implementations, one or more process blocks of FIGS. 6A and 6B may be performed by network management device 210. In some implementations, one or more process blocks of FIGS. 6A and 6B may be performed by another component or a set of components separate from or including network management device 210, such as a component associated with network device 230 (e.g., ROADM 260), or the like.

As shown in FIG. 6A, process 600 may include assigning a set of optical signals to a set of photonic integrated circuits (PICs) (block 605). For example, network management device 210 may assign the set of optical signals to the set of PICs. In some implementations, network management device 210 may assign the set of optical signals to the set PICs at a node of a network (e.g., at a particular ROADM 260 of optical network 220). In some implementations, network management device 210 may assign multiple optical signals to a single PIC. For example, when a node includes multiple PICs, network management device 210 may assign a first set of optical signals to a first PIC, of the multiple PICs, and a second set of optical signals to a second PIC, of the multiple PICs. Additionally, or alternatively, network management device 210 may assign a first set of optical signals to a first PIC associated with a first node and a second set of optical signals to a second PIC associated with a second node.

As further shown in FIG. 6A, process 600 may include generating a wavelength identifier graph for the set of optical signals (block 610). For example, network management device 210 may generate the wavelength identifier graph for the set of optical signals. A wavelength identifier graph may refer to a representation of a logical topology of optical signals being transmitted by a set of nodes (e.g., a set of ROADMs 260) of a network. The logical topology may include a set of optical signals (e.g., that are transmitted between two or more nodes) that may be represented as vertices of the wavelength identifier graph. The logical topology may include a set of lightpath conflicts, such as fiber lightpath conflicts, PIC lightpath conflicts, or the like, that may be represented as edges of the wavelength identifier graph. Although a wavelength identifier graph is described, herein, in terms of a graphical representation, the wavelength identifier graph may be another representation of a logical topology of optical signals, such as a text-based representation, a matrix-based representation, a non-structured representation, or the like. In some implementations, network management device 210 may determine the logical topology of a set of nodes based on a set of potential lightpath conflicts associated with optical signals being transmitted by one or more nodes of the set of nodes. For example, network management device 210 may determine that a particular set of optical signals are utilizing a particular set of links between a particular set of nodes and may identify a particular set of potential lightpath conflicts associated therewith. In this case, network management device 210 may generate a particular wavelength identifier graph that represents the particular set of optical signals and the particular set of potential lightpath conflicts. Additionally, or alternatively, network management device 210 may receive information identifying the wavelength identifier graph, such as a stored wavelength identifier graph, or the like.

As further shown in FIG. 6A, process 600 may include performing wavelength assignment based on the wavelength identifier graph (block 615). For example, network management device 210 may perform wavelength assignment based on the wavelength identifier graph. Wavelength assignment may refer to assigning a wavelength identifier (e.g., that corresponds to a wavelength) to an optical signal. In some implementations, network management device 210 may utilize a particular algorithm (e.g., Brelaz's algorithm) to perform wavelength assignment based on the wavelength identifier graph, as discussed in detail with regards to FIG. 6B. In some implementations, network management device 210 may perform an initial wavelength assignment and may determine whether the initial wavelength assignment satisfies a set of criteria (e.g., a routability criteria, a tunability criteria, or the like). For example, network management device 210 may utilize Brelaz's algorithm to initially assign a set of wavelength identifiers to a set of optical signals. Additionally, or alternatively, network management device 210 may perform wavelength assignment without an initial assignment. For example, network management device 210 may select an optical signal, from a set of optical signals, according to a set of selection criteria, may assign a wavelength identifier to the optical signal (e.g., according to Brelaz's algorithm, according to a set of assignment criteria, such as saturation degree, quantity of unassigned neighbors, or the like) and may confirm that the wavelength identifier assignment does not violate any constraints. In this case, network management device 210 may select one or more other optical signals, from the set of optical signals, for wavelength assignment until network management device 210 has performed wavelength assignment for each optical signal of the set of optical signals.

As shown in FIG. 6B, process 600 may include selecting an optical signal for wavelength assignment (block 620). For example, network management device 210 may select the optical signal, from the set of optical signals, for wavelength assignment. In some implementations, network management device 210 may select the optical signal based on a saturation degree of the optical signal. Saturation degree may refer to a quantity of unique wavelength identifiers assigned to neighboring vertices of the vertex associated with the optical signal. For example, network management device 210 may determine that a vertex of the wavelength identifier graph is neighbored by a first neighboring vertex associated with a first wavelength identifier, a second neighboring vertex associated with the first wavelength identifier, and a third neighboring vertex associated with a second wavelength identifier. In this case, network management device 210 may determine that, for the purposes of determining a saturation degree, the vertex of the wavelength identifier graph is associated with neighboring vertices having two unique wavelength identifiers. In some implementations, network management device 210 may select a particular optical signal associated with a vertex (e.g., of a set of vertices that are not assigned) that is associated with the highest saturation degree compared with the set of vertices that are not assigned (e.g., that have not been assigned a wavelength identifier corresponding to a wavelength).

Additionally, or alternatively, network management device 210 may select the optical signal based on a degree of the vertex associated with the optical signal. A degree of the vertex may refer to a quantity of edges of the wavelength identifier graph that touch the vertex. For example, when a vertex is associated with a set of three edges, network management device 210 may determine that the degree of the vertex is three. In some implementations, network management device 210 may select a particular optical signal associated with a vertex that is associated with the highest degree of the vertex compared with a set of other vertices of the wavelength identifier graph that are not assigned.

Additionally, or alternatively, network management device 210 may select the optical signal based on a quantity of unassigned neighbors of the vertex associated with the optical signal. A quantity of unassigned neighbors refers to the quantity of neighboring vertices to a vertex that have not been assigned a wavelength identifier during wavelength assignment. For example, when a vertex is connected by a first edge to a first vertex associated with a first wavelength identifier, a second edge to a second vertex that has not been assigned a wavelength identifier, and a third edge to a third vertex associated with a second wavelength identifier, network management device 210 may determine that the vertex is associated with one unassigned neighbor. In some implementations, network management device 210 may select a particular optical signal associated with a vertex that is associated with the greatest quantity of unassigned neighbors compared with a set of vertices that are not assigned. Additionally, or alternatively, network management device 210 may select the particular optical signal based on the particular optical signal being associated with the greatest quantity of unassigned neighbors that share a PIC lightpath conflict with the optical signal.

As further shown in FIG. 6B, process 600 may include selecting a wavelength identifier to assign to the optical signal (block 625). For example, network management device 210 may select a wavelength identifier from a set of wavelength identifiers. The wavelength identifier may correspond to a wavelength of a set of wavelengths. In some implementations, network management device 210 may select the wavelength identifier based on an ordering of the set of wavelength identifiers. For example, network management device 210 may order the set of wavelength identifiers based on corresponding wavelength, bandwidth (e.g., of a channel associated with a particular corresponding wavelength), through-put (e.g., of a channel associated with a particular corresponding wavelength), or the like and may select the wavelength identifier based on a selection criteria, such as selecting a wavelength identifier associated with the lowest corresponding wavelength, the greatest corresponding wavelength, or the like. In some implementations, network management device 210 may select the wavelength identifier based on an assignment algorithm, such as Brelaz's algorithm, or the like.

As further shown in FIG. 6B, process 600 may include determining whether the selected wavelength identifier conflicts with another optical signal (block 630). For example, network management device 210 may determine whether the selected wavelength identifier conflicts with another wavelength identifier assigned to another vertex associated with another optical signal. In some implementations, the selected wavelength identifier may conflict with another wavelength identifier if the vertex, to which the selected wavelength identifier is assigned, shares an edge with another vertex that is assigned the same wavelength identifier. For example, if network management device 210 assigns a first wavelength identifier to a first vertex that shares an edge with a second vertex that is assigned the first wavelength identifier, network management device 210 may determine that the selected wavelength identifier conflicts with another optical signal.

As further shown in FIG. 6B, if the selected wavelength identifier does not conflict with another optical signal (block 630—NO), process 600 may include determining whether the wavelength is tunable and routable at either end (block 635). For example, network management device 210 may determine whether the selected wavelength is both tunable and routable at both ends. An end may refer to a PIC associated with a first ROADM 260 that transmits the optical signal and another PIC associated with a second ROADM 260 that receives the optical signal. In some implementations, an end may be a PIC that transmits to another PIC (e.g., another PIC of the same ROADM, another PIC of a different ROADM, or the like).

A selected wavelength may be tunable if a PIC associated with transmitting/receiving the optical signal assigned to the selected wavelength is configurable to tune to the selected wavelength. For example, a first PIC (e.g., a Tx PIC) may be tunable to a first set of wavelengths and a second PIC (e.g., an Rx PIC) may be tunable to a second set of wavelengths, and network management device 210 may determine whether the selected wavelength is included in both the first set of wavelengths and the second set of wavelengths.

Routability of a selected wavelength may refer to a set of constraints limiting a quantity of directions in which optical signals associated with a particular PIC can be routed. For example, a first PIC may connect to a particular set of outputs associated with routing optical signals to a particular set of ROADMs 260 and a second PIC may connect to another set of outputs associated with routing optical signals to another set of ROADMs 260. A constraint may be referred to as a limited degree of routability. In some implementations, network management device 210 may utilize stored information regarding the set of PICs to determine whether the selected wavelength associated with the optical signal and the assigned ends (e.g., a Tx PIC associated with a first ROADM 260 and an Rx PIC associated with a second ROADM 260) is routable.

As further shown in FIG. 6B, if the selected wavelength identifier conflicts with another optical signal (block 630—YES), and/or if the selected wavelength is not tunable and routable at either end (block 635—NO), process 600 may include determining whether a wavelength limit is reached (block 640). For example, network management device 210 may determine whether the wavelength limit is reached. The wavelength limit may refer to a quantity of wavelengths, w, that may be considered for assignment to the optical signal. For example, network management device 210 may determine whether there are no remaining wavelengths, of the set of wavelengths, which have been selected for assignment to the optical signal.

As further shown in FIG. 6B, if the wavelength limit is not reached (block 640—NO), process 600 may include returning to block 625. For example, network management device 210 may select another wavelength identifier, of the set of wavelength identifiers, to assign to the optical signal. In some implementations, network management device 210 may select the other wavelength identifier based on a saturation degree, a degree of the vertex, a quantity of unassigned neighbors, or the like.

As further shown in FIG. 6B, if the wavelength limit is reached (block 640—YES), process 600 may include moving the optical signal to another PIC (block 645). For example, network management device 210 may move the optical signal to another PIC associated with a particular ROADM 260. In some implementations, network management device 210 may select another PIC, of a set of other PICs associated with the particular ROADM 260, based on a quantity of optical signals being transmitted by the other PIC, a quantity of wavelengths assigned to optical signals being transmitted by the other PIC, or the like. In some implementations, network management device 210 may move the optical signal to another transmitting PIC associated with the same or a different ROADM 260, another receiving PIC associated with the same or a different ROADM 260, or the like. Additionally, or alternatively, network management device 210 may move the optical signal to another transmitting PIC associated with a first ROADM 260 and to another receiving PIC associated with a second ROADM 260. In some implementations, network management device 210 may iteratively move the optical signal to one or more other PICs until network management device 210 is able to determine a wavelength identifier that does not conflict with another optical signal and is able to determine that the selected wavelength is tunable and routable at either end.

As further shown in FIG. 6B, process 600 may include updating the wavelength identifier graph based on moving the optical signal to the other PIC (block 650) and returning to block 620. For example, network management device 210 may update the wavelength identifier graph based on moving the optical signal to the other PIC. In some implementations, network management device 210 may alter a set of edges and a set of vertices when updating the wavelength identifier graph. For example, network management device 210 may remove a vertex associated with the optical signal and may remove edges associated with the vertex. In some implementations, network management device 210 may remove one or more other edges of the wavelength identifier graph and/or add one or more other edges to the wavelength identifier graph. In some implementations, network management device 210 may activate another PIC when moving the optical signal to the other PIC. For example, when network management device 210 is unsuccessful with wavelength assignment for all active PICs of ROADM 260, network management device 210 may activate another PIC of ROADM 260 for the optical signal.

In some implementations, network management device 210 may generate another wavelength identifier graph. For example, network management device 210 may determine another logical topology for the optical signals based on moving the optical signal to the other PIC and may generate another wavelength identifier graph based on the other logical topology for the optical signals. In some implementations, network management device 210 may generate another wavelength identifier graph for the other PIC. For example, network management device 210 may generate another wavelength identifier graph associated with the other PIC to perform wavelength assignment for the other PIC based on moving the optical signal to the other PIC. In some implementations, network management device 210 may select another optical signal, of the set of optical signals, for wavelength assignment.

As further shown in FIG. 6B, if the selected wavelength is tunable and routable at either end (block 635—YES), process 600 may include assigning the wavelength identifier to the optical signal (block 655). For example, network management device 210 may assign the wavelength corresponding to the wavelength identifier to the optical signal. In some implementations, network management device 210 may instruct ROADM 260 to transmit and/or receive the optical signal at the wavelength corresponding to the wavelength identifier. For example, network management device 210 may cause a laser associated with a particular PIC of ROADM 260 to be tuned to the wavelength that corresponds to the wavelength identifier when transmitting/receiving the optical signal. Additionally, or alternatively, network management device 210 may wait until wavelength assignment is complete before causing the laser associated with the particular PIC of ROADM 260 to be tuned to the wavelength.

As further shown in FIG. 6B, process 600 may include determining whether there are any optical signals without an assigned wavelength identifier (block 660). For example, network management device 210 may determine whether another optical signal, of the set of optical signals, lacks an assigned wavelength identifier corresponding to a wavelength.

As further shown in FIG. 6B, if there is another optical signal without an assigned wavelength identifier (block 660—YES), process 600 may include returning to block 620. For example, network management device 210 may select the other optical signal for wavelength assignment, as discussed herein with regard to block 620. In some implementations, network management device 210 may select the other optical signal, from a set of other optical signals that have not been assigned a wavelength identifier corresponding to a wavelength, based on a criteria, such as a saturation degree, a degree of a vertex associated with the other optical signal, a quantity of unassigned neighbors, or the like.

As further shown in FIG. 6B, if there are not any optical signals without an assigned wavelength identifier (block 660—NO), process 600 may include determining wavelength assignment is complete (block 665). For example, network management device 210 may determine that wavelength assignment is complete and may notify a set of ROADMs 260 associated with transmitting/routing/receiving the set of optical signals that the set of optical signals may be transmitted/routed/received using the set of assigned wavelengths. In some implementations, network management device 210 may monitor optical network 220 to determine whether wavelength assignment should be performed again based on an alteration to optical network 220. For example, network management device 210 may receive information from network devices 230 of optical network 220 indicating the alteration to optical network 220, such as an optical signal being added, an optical signal being dropped, a quantity of network traffic being altered, or the like. In this case, network management device 210 may determine whether a topology (e.g., a logical topology, a fiber topology, or the like) has changed, and may perform wavelength assignment again based on determining that the topology has changed.

Although FIGS. 6A and 6B shows example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7:
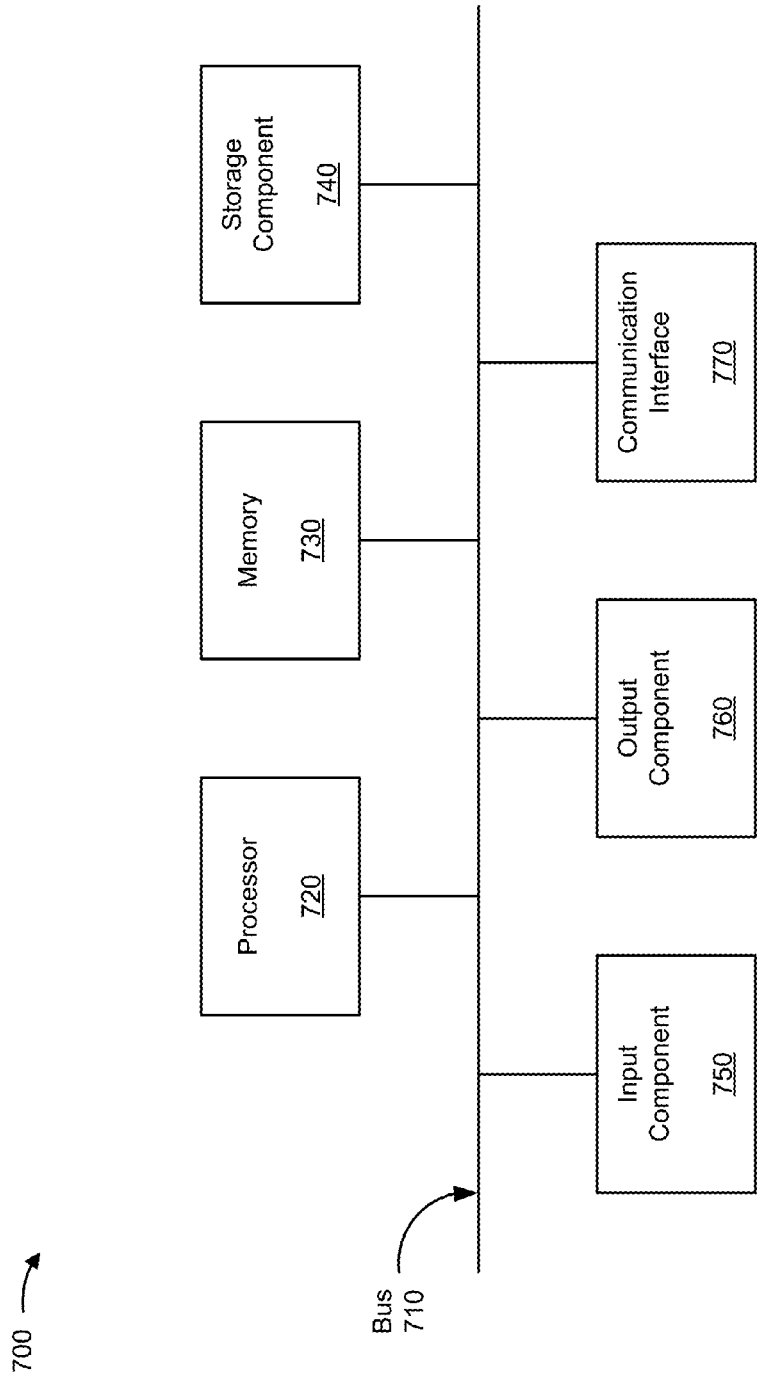
FIG. 7 is a diagram of example components of one or more devices described herein.

FIG. 7 is a diagram of example components of a device 700. Device 700 may correspond to network management device 210, and/or another device described herein. In some implementations, network management device 210, and/or another device described herein may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 may include a component that permits communication among the components of device 700. Processor 720 is implemented in hardware, firmware, or a combination of hardware and software. Processor 720 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 730 may include a random access memory (RAM), a read only memory (ROM), and/or another type of dynamic or static storage device (e.g., a flash memory, a magnetic memory, an optical memory, etc.) that stores information and/or instructions for use by processor 720.

Storage component 740 may store information and/or software related to the operation and use of device 700. For example, storage component 740 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 750 may include a component that permits device 700 to receive information, such as via user input (e.g., a touch screen display, a keyboard, a keypad, a mouse, a button, a switch, a microphone, etc.). Additionally, or alternatively, input component 750 may include a sensor for sensing information (e.g., a global positioning system (GPS) component, an accelerometer, a gyroscope, an actuator, etc.). Output component 760 may include a component that provides output information from device 700 (e.g., a display, a speaker, one or more light-emitting diodes (LEDs), etc.).

Communication interface 770 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

In this way, a ROADM may output optical signals within a super-channel in multiple directions and a network management device, associated with the ROADM, may efficiently assign optical signal wavelengths based on a set of criteria that includes avoiding a lightpath conflict.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An apparatus, comprising:
one or more processors configured to:
determine a set of optical signals associated with an optical network including a set of optical links and a set of optical nodes;
determine topology information for the set of optical signals and the optical network,
the topology information including information identifying a particular set of lightpath conflicts,
the particular set of lightpath conflicts including a first set of lightpath conflicts associated with the set of optical links and a second set of lightpath conflicts associated with the set of optical nodes,
the topology information corresponding to a wavelength identifier graph,
the wavelength identifier graph including a set of vertices corresponding to the set of optical signals and a set of edges corresponding to the first set of lightpath conflicts and the second set of lightpath conflicts;
select an optical signal, from the set of optical signals, based on the wavelength identifier graph;
selectively assign a wavelength identifier, of a set of wavelength identifiers, to the optical signal based on the wavelength identifier graph,
the wavelength identifier, of the set of wavelength identifiers,
corresponding to a wavelength of a set of wavelengths; and
cause the optical signal to utilize the wavelength, of the set of wavelengths, for transmission via one or more super-channels of the optical network.

2. The apparatus of claim 1, where the one or more processors are further configured to:
determine a saturation degree of the optical signal,
the saturation degree being determined based on a quantity of wavelength identifiers, of the set of wavelength identifiers, associated with neighboring vertices to a particular vertex corresponding to the optical signal; and
where the one or more processors, when selecting the optical signal based on the wavelength identifier graph, are further to:
select the optical signal from the set of optical signals based on the saturation degree of the optical signal.

3. The apparatus of claim 1, where the one or more processors are further configured to:
determine a degree of a vertex corresponding to the optical signal,
the degree of the vertex being determined based on a quantity of edges, of the set of edges, associated with the vertex corresponding to the optical signal; and
where the one or more processors, when selecting the optical signal based on the wavelength identifier graph, are further to:
select the optical signal from the set of optical signals based on the degree of the vertex corresponding to the optical signal.

4. The apparatus of claim 1, where the one or more processors are further configured to:
determine a quantity of unassigned neighbors of a vertex, of the set of vertices, corresponding to the optical signal,
the quantity of unassigned neighbors being other vertices, of the set of vertices, that neighbor the vertex and have not been assigned a particular wavelength identifier, of the set of wavelength identifiers, corresponding to a particular wavelength; and
where the one or more processors, when selecting the optical signal based on the wavelength identifier graph, are further to:
select the optical signal from the set of optical signals based on the quantity of unassigned neighbors.

5. The apparatus of claim 1, where the one or more processors, when selectively assigning the wavelength identifier, are further configured to:
select a particular wavelength identifier, of the set of wavelength identifiers, to assign to the optical signal;
determine that the particular wavelength identifier, of the set of wavelength identifiers, is not tunable by a transmitter associated with the optical signal; and
select another wavelength identifier, of the set of wavelength identifiers, to assign to the optical signal based on the wavelength identifier graph.

6. The apparatus of claim 1, where the one or more processors, when selectively assigning the wavelength identifier, are further configured to:
select a particular wavelength identifier, of the set of wavelength identifiers, to assign to the optical signal;
determine that the particular wavelength identifier, of the set of wavelength identifiers, is not tunable by a receiver associated with the optical signal; and
select another wavelength identifier, of the set of wavelength identifiers, to assign to the optical signal based on the wavelength identifier graph.

7. The apparatus of claim 1, where the one or more processors, when selectively assigning the wavelength identifier, are further configured to:
select a particular wavelength identifier, of the set of wavelength identifiers, to assign to the optical signal;
determine that the optical signal is not routable based on selecting the particular wavelength identifier; and
select, based on determining that the optical signal is not routable, another wavelength identifier, of the set of wavelength identifiers, to assign to the optical signal based on the wavelength identifier graph.

8. A system comprising,
one or more devices configured to:
determine topology information for a set of optical signals associated with an optical network that includes a set of optical nodes and a set of optical links, the topology information identifying a set of lightpath conflicts associated with the set of optical links and/or the set of optical nodes;
the topology information corresponding to a graph that includes a set of vertices corresponding to the set of optical signals and a set of edges corresponding to the set of lightpath conflicts;
selectively assign a set of wavelengths to the set of optical signals based on the graph; and
cause a plurality of optical nodes, of the set of optical nodes, to transmit or receive the set of optical signals using the assigned set of wavelengths.

9. The system of claim 8, where an optical node, of the plurality of optical nodes, includes a first optical transmitter and a second optical transmitter; and
where the one or more devices, when selectively assigning the set of wavelengths, are further configured to:
determine that the set of wavelengths does not include a particular wavelength that is tunable and routable for a particular optical signal of the set of optical signals; and
cause the particular optical signal to be moved from the first optical transmitter to the second optical transmitter.

10. The system of claim 9, where the one or more devices are further configured to:
activate the second optical transmitter.

11. The system of claim 9, where the first optical transmitter is associated with a first photonic integrated circuit and the second optical transmitter is associated with a second photonic integrated circuit.

12. The system of claim 8, where an optical node, of the plurality of optical nodes, includes a first optical receiver and a second optical receiver; and
where the one or more devices, when selectively assigning the set of wavelengths, are further configured to:
determine that the set of wavelengths does not include a particular wavelength that is tunable and routable for a particular optical signal of the set of optical signals; and
cause the optical signal to be moved from the first optical receiver to the second optical receiver.

13. The system of claim 12, where the one or more devices are further configured to:
activate the second optical receiver.

14. The system of claim 8, where the one or more devices are further configured to:
determine a set of saturation degrees for the set of optical signals,
a saturation degree, of the set of saturation degrees, being determined for an optical signal, of the set of optical signals, based on a quantity of wavelength identifiers, of a set of wavelength identifiers, associated with neighboring vertices of a particular vertex corresponding to the optical signal; and
where the one or more devices, when selectively assigning the set of wavelengths, are further to:
selectively assign the set of wavelengths in an order determined based on the set of saturation degrees.

15. A method, comprising:
determining, by a device, a wavelength identifier graph corresponding to an optical network based on a set of lightpath conflicts, for a set of optical signals, associated with a set of links and a set of nodes of the optical network,
one or more optical signals, of the set of optical signals, being associated with transmission from a first node, of the set of nodes, to a second node, of the set of nodes, via a super-channel,
the first node including a transmitter photonic integrated circuit,
the second node including a receiver photonic integrated circuit;
selectively assigning, by the device, a wavelength identifier to an optical signal, of the set of optical signals, based on the wavelength identifier graph,
the wavelength identifier being associated with a set of wavelength identifiers and corresponding to a wavelength of a set of wavelengths; and
causing, by the device, the optical signal to utilize the wavelength, of the set of wavelengths, for transmission via the optical network.

16. The method of claim 15, where a node, of the set of nodes, includes an optical transmitter; and
where causing the optical signal to utilize the wavelength further comprises:
causing the optical transmitter associated with the node, of the set of nodes, to transmit the optical signal at the wavelength.

17. The method of claim 15, where a node, of the set of nodes, includes an optical receiver; and
where causing the optical signal to utilize the wavelength further comprises:
causing the optical receiver associated with the node, of the set of nodes, to receive the optical signal at the wavelength.

18. The method of claim 15, where selectively assigning the wavelength identifier further comprises:
determining that the set of wavelengths does not include a particular wavelength that is tunable and routable for the optical signal; and
causing the optical signal to be moved from a first transmitter associated with a first node, of the set of nodes, to a second transmitter associated with a second node, of the set of nodes.

19. The method of claim 15, further comprising:
selecting the optical signal from the set of optical signals based on at least one of:
a saturation degree for a vertex,
the vertex representing the optical signal in the wavelength identifier graph,
the saturation degree being associated with a quantity of wavelength identifiers associated with a set of neighboring vertices representing other optical signals in the wavelength identifier graph;
a degree of the vertex,
the degree of the vertex being associated with a quantity of edges of the wavelength identifier graph adjacent to the vertex,
an edge, of the quantity of edges, representing a lightpath conflict of the set of lightpath conflicts; or
a quantity of unassigned neighbors,
the quantity of unassigned neighbors being associated with a quantity of vertices neighboring the vertex that have not been assigned a respective wavelength identifier.

20. The method of claim 15, where selectively assigning the wavelength identifier further comprises:
selecting a particular wavelength identifier, of the set of wavelength identifiers, to assign to the optical signal;
determining that the optical signal is not routable based on selecting the particular wavelength identifier; and selecting another wavelength identifier, of the set of
wavelength identifiers, to assign to the optical signal
based on the wavelength identifier graph,
the other wavelength identifier corresponding to
another wavelength of the set of wavelengths.

\* \* \* \* \*